United States Patent [19]
Fong et al.

[11] Patent Number: 6,065,495
[45] Date of Patent: May 23, 2000

[54] TWO-POSITION, THREE-WAY SOLENOID-ACTUATED VALVE

[75] Inventors: Keith B. Fong, El Paso, Tex.; David Fredrick Reuter, Beavercreek; Viswanath Seetharaman, Fairborn, both of Ohio; Dale Lee Baldauf, Pendleton, Ind.

[73] Assignee: General Motors Corporation, Detroit, Mich.

[21] Appl. No.: 09/244,315

[22] Filed: Feb. 4, 1999

[51] Int. Cl.[7] .................................................. F15B 13/044
[52] U.S. Cl. .................................. 137/625.25; 137/625.5; 251/129.02; 251/129.14; 251/129.19; 303/119.2
[58] Field of Search ........................... 137/625.5, 625.65; 251/129.02, 129.14, 129.19; 303/119.2

[56] References Cited

U.S. PATENT DOCUMENTS

| | | |
|---|---|---|
| 4,844,119 | 7/1989 | Martinic ............................. 137/596.17 |
| 4,936,344 | 6/1990 | Gilbert et al. ...................... 137/596.17 |
| 5,167,442 | 12/1992 | Alaze et al. ................... 251/129.19 X |
| 5,467,797 | 11/1995 | Seetharaman et al. ........ 251/129.14 X |
| 5,496,100 | 3/1996 | Schmidt .......................... 137/129.19 X |
| 5,556,175 | 9/1996 | Hayakawa et al. ............ 251/129.02 X |
| 5,752,750 | 5/1998 | Lubischer et al. ................... 303/119.2 |

*Primary Examiner*—Gerald A. Michalsky
*Attorney, Agent, or Firm*—Margaret A. Dobrowitsky

[57] ABSTRACT

A two-position, three-way solenoid-actuated valve includes a valve assembly having an axial opening and a valve member fixed in the axial opening with a first valve seat and a second valve seat disposed in the axial opening. The valve assembly including a ball disposed in the axial opening and moveable between the first valve seat and the second valve seat. The two-position, three-way solenoid-actuated valve also includes an electromagnetic coil assembly engaging the valve assembly to move the ball between the first valve seat and the second valve seat to open and close a fluid path through the valve assembly to provide directional flow control.

23 Claims, 2 Drawing Sheets

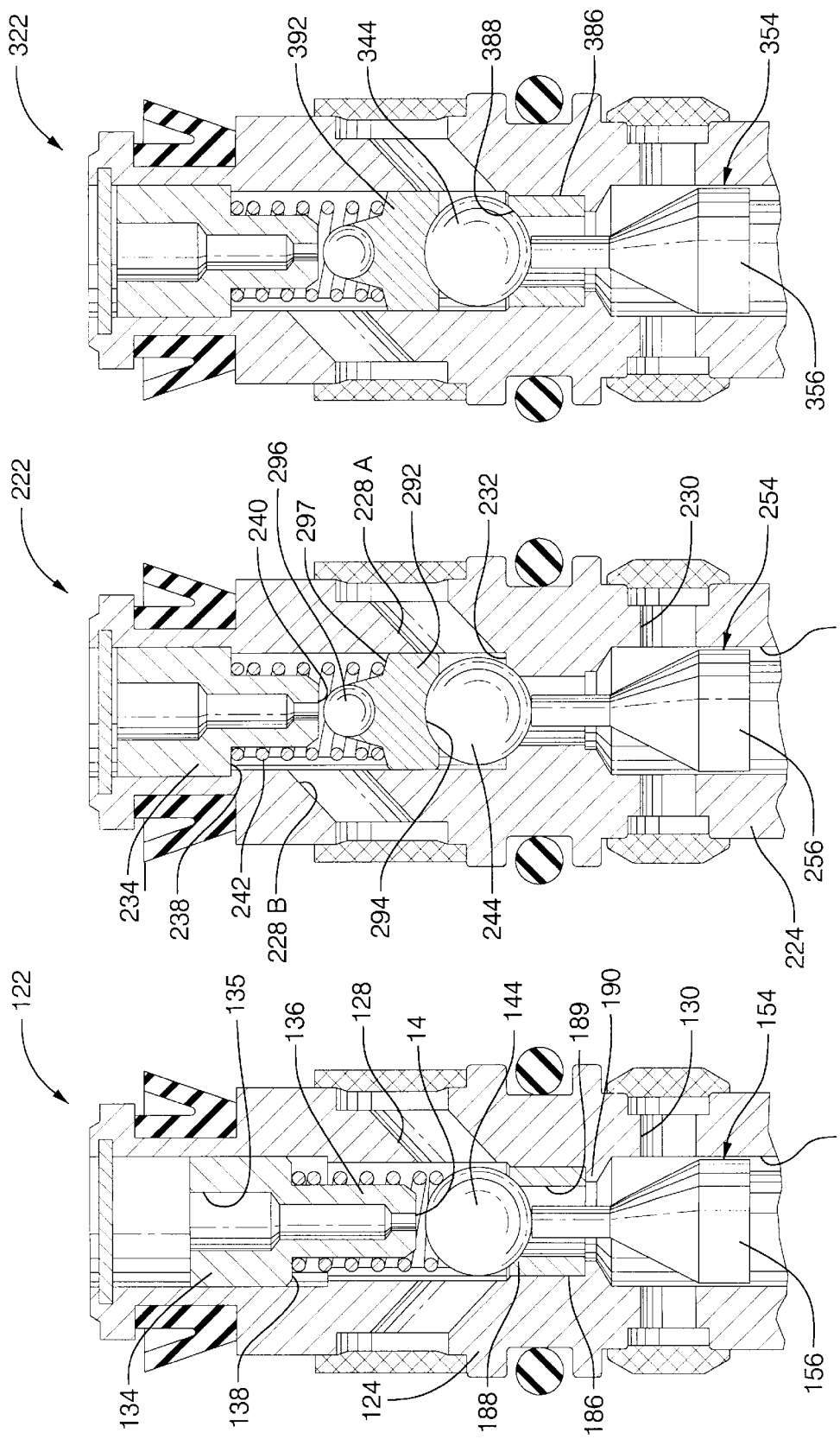

TWO-POSITION, THREE-WAY SOLENOID-ACTUATED VALVE

TECHNICAL FIELD

The present invention relates generally to solenoid-actuated valves and, more particularly, to a two-position, three-way solenoid-actuated valve.

BACKGROUND OF THE INVENTION

Directional flow control valves of numerous variety are available that provide many types of control characteristics which are often tailored to specific applications. Although sharing the common function of directional flow control, these valves vary considerably in construction and operation.

A common simple type of directional flow control valve is a two-position, three-way valve. A facility for providing two finite positions of a moving element yields fluid flow control by opening and closing flow paths through the valve by placement of the moving element in definite positions.

A conventional method of valve actuation to position the moving element is through use of a solenoid. With a solenoid actuator, electric energy is applied to a coil, which creates a magnetic field that draws an armature into the coil. The armature motion is typically transmitted through a rod, which in turn positions the moving member.

Conventional three-way fluid flow control valves as thus far described are generally simple in construction and provide limited directional control through the valve between a first port and either of a second or a third port. When more complicated control mechanisms are required to be provided by the valve in order to adequately control a complicated fluid control scheme of a system, such a conventional valve must be supplemented with additional componentry. When functions other than solely providing directional control are required, additional fluid flow control mechanisms such as check valves and additional directional control valves are added to the system. When available space does not permit the addition of ancillary flow control mechanisms or functional response of amassed individual components is unacceptable, the conventionally available fluid flow control components are inadequate. Therefore, with complicated fluid control schemes a new flow control mechanism is required.

SUMMARY OF THE INVENTION

Accordingly, the present invention is a two-position, three-way solenoid-actuated valve. The two-position, three-way solenoid-actuated valve includes a valve assembly having an axial opening and a valve member fixed in the axial opening with a first valve seat and a second valve seat disposed in the axial opening. The valve assembly includes a ball disposed in the axial opening and moveable between the first valve seat and the second valve seat. The two-position, three-way solenoid-actuated valve also includes an electromagnetic coil assembly engaging the valve assembly to move the ball between the first valve seat and the second valve seat to open and close a fluid path through the valve assembly to provide directional flow control.

One advantage of the present invention is that a two position, three-way solenoid-actuated valve is provided. Another advantage of the present invention is that the two-position, three-way solenoid-actuated valve eliminates separate check valves and relief valves. Yet another advantage of the present invention is that the two position, three-way solenoid-actuated valve has fewer parts, requires fewer manufacturing processes, fewer manufacturing adjustments and offers improved performance and improved quality. Still another advantage of the present invention is that the two position, three-way solenoid-actuated valve decreases system size and cost.

Other features and advantages of the present invention will be readily appreciated, as the same becomes better understood after reading the subsequent description when considered in connection with the accompanying drawings.

BRIEF DESCRIPTION OF THE DRAWINGS

FIG. 2 is an enlarged view of another embodiment of a valve assembly, according to the present invention, of the two-position, three-way solenoid actuated-valve of FIG. 1.

FIG. 3 is a view similar to FIG. 2 of yet another embodiment of the valve assembly, according to the present invention, of the two-position, three-way solenoid-actuated valve of FIG. 1.

FIG. 4 is a view similar to FIG. 2 of still another embodiment of the valve assembly, according to the present invention, of the two-position, three-way solenoid-actuated valve of FIG. 1.

DESCRIPTION OF THE PREFERRED EMBODIMENT

Figure 1:
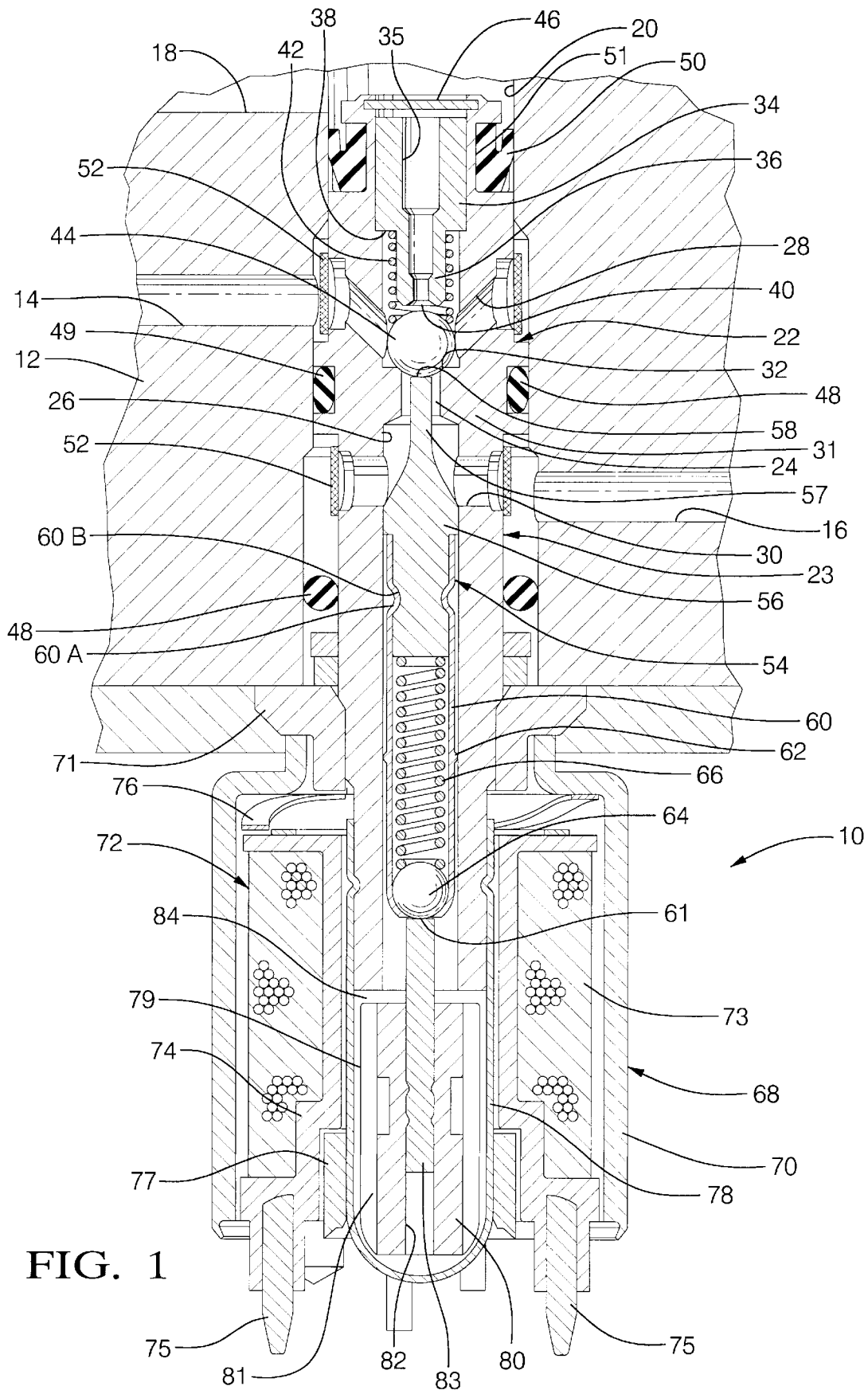
FIG. 1 is a fragmentary, cross-sectional view of a two-position, three-way solenoid-actuated valve, incorporating aspects of the present invention, illustrated in a de-energized state.

Referring to the drawings and in particular FIG. 1, one embodiment of a two-position, three-way solenoid-actuated valve 10, according to the present invention, is shown depicting the operational features of the present invention. Other valve arrangements including the specific features provided by the present invention are possible while preferably maintaining a simplified configuration according to the present invention.

The two-position, three-way solenoid-actuated valve 10 includes a module 12 having a first port 14, a second port 16 and a third port 18. The module 12 also has a cavity 20 extending axially. The ports 14, 16 and 18 comprise bores, which extend through the module 12 to the cavity 20.

The two-position, three-way solenoid-actuated valve 10 includes a hydraulic valve assembly, according to the present invention and generally indicated at 22, to control the flow of fluid between the ports. 14, 16 and 18. It should be appreciated that the cavity 20 provides a specifically formed opening for the insertion of the valve assembly 22.

Referring to FIG. 1, the valve assembly 22, according to the present invention, includes a housing assembly, generally indicated at 23. The housing assembly 23 includes a valve body or housing 24 that provides generally a base for valving and actuating components. The housing 24 is generally cylindrical in shape and has an opening 26 extending axially therethrough. The housing 24 also includes a plurality of ports or bores 28 and 30 extending transversely through the housing 24, which provide fluid passageways. The bore 28 is angled to maximize the fluid flow area for the fluid to flow to a prime valve orifice 3 1. The housing 24 further includes a prime valve seat 32, which is co-axially disposed in the opening 26. The housing 24 is made of a metal material such as a ferromagnetic material.

The housing assembly 23 also includes an insert valve seat or valve member 34 disposed in one end of the opening 26. The valve member 34 is pressed into the housing 24 and held in place by suitable means such as an interference fit. The valve member 34 is made of hardened steel. The valve member 34 is generally cylindrical in shape and extends axially. The valve member 34 has a passageway 35 extending axially therethrough. The valve member 34 has a neck or stem 36 extending axially and has a diameter less than a remainder of the valve member 34 to form a shoulder 38. The stem 36 has an isolation valve seat 40 at one end adjacent the bore 28 of housing 24. The isolation valve seat 40 is hardened to minimize wear. It should be appreciated that the hardened steel minimizes the deformation to the valve member 34. It should also be appreciated that the stem 36 is sized to control a return spring 42 to be described and its maximum compression and, consequently, maximum spring force. It should further be appreciated that the valve member 34 establishes the return spring 42 minimum compression and, consequently, the spring pre-load force.

The housing assembly 23 includes a return spring 42 such as a coil spring disposed about the stem 36 and having one end contacting the shoulder 38. The housing assembly 23 also includes a sealing ball 44 disposed between the isolation valve seat 40 and the prime valve seat 32. The ball 44 has a relatively large diameter. The spring 42 has its other end contacting the ball 44. The ball 44 functions as an obturator, operating to alternately close the opening 26 to prevent fluid flow between the bore 28 and the bore 30. The ball 44 also functions to alternately close the passageway 35 of the valve member 34 to prevent fluid flow between the first port 18 and the bore 28. It should be appreciated that the spring 42 provides direct contact on the ball 44 to improve spring force transmission for valve sealing.

The housing assembly 23 includes a flat or planar filter 46 at one end of the opening 26 and held to the housing 24 by suitable means such as a crimp. The filter 46 prevents particulate in the fluid from entering the opening 26 through the port 18, which may foul the valve member 34. The filter 46 allows fluid flow between the port 18 and the passageway 35 of the valve member 34. The housing assembly 23 also includes a plurality of seals 48 such as an o-ring disposed in an annular groove 49 and about the housing 24 and contacting the module 12 to prevent fluid flow between the ports 14 and 16. The housing assembly 23 includes a lip seal 50 disposed in an annular lip seal groove 51 about the housing 24 and contacting the module 12. The lip seal 50 is made of an elastomer and is deflected by differential pressure. The lip seal 50 acts as a check valve to allow fluid flow from port 14 to port 18 but prevent fluid flow from port 18 to port 14. The lip seal 50 has a reversed orientation for improved sealing. The housing assembly 23 further includes a plurality of band filters 52 with one at each port 14,16. The band filters 52 are made of a plastic material and stretched over the housing 24 to be held in place. The band filters 52 prevent particulate in the fluid from entering the housing 24 and fouling the valve member 34 or the prime valve seat 32. It should be appreciated that fouling could cause leakage or could impair movement of a blow-off assembly 54 or armature assembly 79 to be described The valve assembly 22 also includes a self-contained floating blow-off assembly, generally indicated at 54, disposed in the valve assembly 22 to allow blow-off spring pre-load. The blow-off assembly 54 includes a blow-off rod 56 disposed in the opening 26 of the housing 24. The blow-off rod 56 is generally cylindrical in shape and extends axially. The blow-off rod 56 has an outer diameter, which guides the blow-off assembly 54 by sliding along a wall of the opening 26. The blow-off rod 56 has a rod portion 57 of a diameter less than the remainder of the blow-off rod 56 extending axially from a radius 57a for improved fluid flow. The rod portion 57 has a dimple 58 at one end to engage the ball 44 for improved contact with the ball 44. The dimple 58 has a relatively small diameter compared to the ball 44 to promote blow-off leakage due to geometry mismatch.

The blow-off assembly 54 includes a case 60 extending axially from the blow-off rod 56 opposite the rod portion 57. The case 60 has a crimp 60a to secure the case 60 in a groove 60b of the blow-off rod 56. The case 60 is generally tubular and has an aperture 61 at one end. The case 60 includes an annular bead 62 extending radially that creates a radial clearance between the case 60 and the wall of the opening 26. The bead 62 works with the outer diameter of the blow-off rod 56 to guide the blow-off assembly 54. The case 60 has at least one transverse port (not shown) between the bead 62 and the end of the blow-off rod 56 to prevent hydraulic lock when the blow-off assembly 54 is actuated. The case 60 is made from a drawn metal material. It should be appreciated that the radial clearance minimizes hydraulic damping between the blow-off assembly 54 and the wall of the opening 26 and improves cold temperature response. It should also be appreciated that guidance of the blow-off assembly 54 is required to ensure that the ball 44 is not pushed to the side of the isolation valve seat 40 of the valve member 34. It should further be appreciated that the crimp 60a allows variable adjustment in the blow-off assembly 54 such that component tolerances can be relaxed while a relief valve function is optimized in the assembly process.

The blow-off assembly 54 includes a ball 64 disposed within the case 60 to close the aperture 61. The blow-off assembly 54 further includes a spring 66 such as a coil spring disposed within the case 60 and having one end contacting the end of the blow-off rod 56 and the other end contacting the ball 64. It should be appreciated that the spring 66 is compressed between the end of the blow-off rod 56 and the ball 64 such that it operates to force the ball 64 against the case 60 to close the aperture 62.

The two-position, three-way solenoid-actuated valve 10 includes an electromagnetic coil assembly, generally indicated at 68, to actuate the blow-off assembly 54. The electromagnetic coil assembly 68 includes a case 70, which is substantially cylindrical in shape. The case 70 abuts a flange 71 of the valve assembly 22 adjacent the module 12 and disposed about the housing 24. The flange 71 is held by an interference fit to the housing 24. The valve assembly 22 is disposed in the cavity of the module 12 and held in place by suitable means such as peening to displace metal from the module 12 over the flange 71.

The electromagnetic coil assembly 68 also includes a coil assembly, generally indicated at 72, disposed within the case 70. The coil assembly 72 includes an annular coil 73 formed of a plurality of turns of copper wire wound on a plastic bobbin 74 positioned within the case 70. The coil assembly 72 also has insert molded metal terminals 75 extending from the bobbin 74 for connection to a source of electric power (not shown) such as a circuit board.

The electromagnetic coil assembly 68 also includes a flat spring 76 disposed between the bobbin 74 and case 70. The electromagnetic coil assembly 68 further includes a lid 77 at one end of the case 70. The lid 77 is held to the case 70 by suitable means such as a crimp. The lid 77 has an inner diameter, which guides the electromagnetic coil assembly 68 and minimizes the gap between the lid 77 and the armature 80 to be described. The case 70 and lid 77 fit loosely over the coil assembly 72. It should be appreciated that this looseness is to absorb stack-up variation between the hydraulic and electrical halves of the solenoid-actuated valve 10 when assembled. It should also be appreciated that when the electrical and hydraulic halves are assembled, the flat spring 76 pushes the case 70 against the flange 71 to eliminate any air gap.

The valve assembly 22 further includes a cup 78 positioned within the case 70 and having one end disposed over and connected to one end of the housing 24 by suitable means such as a circumferential hermetic laser weld. The cup 78 is generally cylindrical and tubular in shape. The cup 78 extends axially into the bobbin 74 of the coil assembly 72. The cup 78 is formed of a drawn paramagnetic stainless steel comprised of a ferromagnetic material.

The valve assembly 22 includes an armature assembly, generally indicated at 79, disposed in the cup 78. The armature assembly 79 includes a moveable armature 80. The armature 80 is comprised of a powdered metal ferromagnetic material and is generally cylindrical in shape. The armature 80 has a pair of longitudinal or axial slots 81 to minimize hydraulic damping. The armature 80 includes a passageway 82 extending axially therethrough. The armature assembly 79 also includes a rod 83 disposed in one end of the passageway 82. The rod 83 is generally cylindrical and circular in shape. The rod 83 extends from the armature 80, through the axial opening 26 of the housing 24 and contacts the ball 64. The rod 83 is fixed in the passageway 82 and attached to the armature 80 by suitable means such as staking to compensate for the stack-up variation of the housing 24 and blow-off assembly 54. The rod 83 is made of hardened steel for wear resistance in contact with the ball 64. It should be appreciated that the armature assembly 79 moves along an axis of the valve assembly 22 and transmits the electromagnetic force as a mechanical motion and force to the blow-off assembly 54 that, in turn, transmits the motion and force to the ball 44. It should also be appreciated that the cup 78 guides the movement of the armature assembly 79.

The actuator's magnetic circuit includes the armature 80, flange 71, lid 77, case 70 and housing 24. Magnetic flux is generated in the circuit by the coil 73. A working air gap 84 is located between the armature 80 and the housing 24. The flux traverses the air gap 84 and induces an electromagnetic force that acts upon the armature 80 and varies as the armature 80 moves.

In operation, the two-position, three-way solenoid-actuated valve 10 is shown in the de-energized state in FIG. 1. The spring 66, as described above, is sized to be stronger than the spring 42. This functions to ensure that the blow-off assembly 54 acts as a rigid body to transmit the force from the armature 80 to the ball 44. In normal, de-energized operation, when a driver press a brake pedal (not shown), brake fluid flows from a master cylinder (not shown) and enters the valve assembly 22 through the band filter 52 to the bore 28. The fluid flows through the bore 28, into the opening 26, through the valve member 34 and then exits through the flat filter 46 on the way to a brake wheel cylinder (not shown). The fluid can also flow through a second path between the housing 24 and the wall of the cavity 20 to the lip seal 50 where the differential fluid pressure causes the lip of the lip seal 50 to deflect and allow flow to the brake wheel cylinder.

When fluid flow is reversed such as when the brake pedal is released and the fluid flows from the wheel cylinder to a reservoir in normal operation, there is only one return path. The fluid flows through the flat filter 46, valve member 34, opening 26, bore 28 and exits through the band filter 52. It should be appreciated that the second path past the lip seal 50 is closed by differential pressure.

During normal, de-energized operation, flow through two paths to a pump (not shown) is prevented. The first path is through the annulus between the housing 24 and the wall of the cavity 20, which is permanently sealed. The second path is through the prime valve orifice 31. This path is closed by the ball 44, which is pressed against the prime valve seat 32 by the return spring 42. Seating of the ball 44 isolates the port 16 from the ports 14 and 18. It should be appreciated that when pressure is applied from the master cylinder, the pre-load force of the return spring 42 is augmented by the force created by the fluid differential pressure to enhance the sealing action.

When the electromagnetic coil assembly 68 is energized, the armature assembly 79 is drawn by the magnetic field to the housing 24, closing the air gap 84. The motion and mechanical force created by the magnetic field is transmitted by the armature assembly 79 to the blow-off assembly 54. The blow-off assembly 54 is essentially rigid and transmits the motion and mechanical force to the ball 44. The ball 44 is pushed from the prime valve seat 32 to the isolation valve seat 40. Once the ball 44 is resting on the isolation valve seat 40, any remaining travel of the armature assembly 79 moves the ball 66 to compress the spring 64 of the blow-off assembly 54. At this point, a path is open from the brake system reservoir to the brake system pump inlet. Fluid enters through the band filter 52, flows through the bore 28, the prime valve seat 32, the prime valve orifice 31, into the opening 26, through the bore 30 and finally through the band filter 52. Seating of the ball 44 isolates port 18 from the ports 14 and 16. It should be appreciated that there is no reverse flow.

The blow-off assembly 54 limits the pressure in the brake circuit when the solenoid-actuated valve 10 is energized. The blow-off assembly 54 pushes the ball 44 against the isolation valve seat 40. When the brake system pump is operating, it is forcing fluid into the brake circuit. This fluid pushes against the lip seal 50 and ball 44. As the fluid pressure increases, the hydraulic force acting on the ball 44 increases. This hydraulic force and the return spring 42 force together act against the spring 66 in the blow-off assembly 54. As the sum of the hydraulic force and return spring 42 force increase to equal the force of the spring 66 of the blow-off assembly 54, the ball 44 begins to move off of the isolation valve seat 40. The ball 44 pushes against the blow-off rod 56 and the spring 66 compresses to absorb the movement of the blow-off rod 56 and case 60. As the ball 44 rises from the isolation valve seat 40, fluid in the brake circuit flows through the passageway 35 and isolation valve seat 40 into the opening 26. From the opening 26, the fluid can flow out the bore 28 and through the band filter 52 to return to the reservoir. The fluid can also flow from the opening 26 back through the prime valve seat 32 and through the bore 30 and band filter 52 to return to the pump inlet.

Referring to FIG. 2, another embodiment 122, according to the present invention, of the valve assembly 22 is shown. Like parts of the valve assembly 22 have like reference numerals increased by one hundred (100). The valve assembly 122 incorporates a valve seat insert 186 having a second hardened seat 188 for improved leak control. The valve seat insert 186 is generally cylindrical and circular in shape. The valve seat insert 186 has an aperture 189 extending axially therethrough. The valve seat insert 186 is disposed in the opening 126 and abuts a shoulder 190.

In the de-energized state of FIG. 2, the spring 142 is disposed about the stem 136 and contacts the shoulder 138 and the ball 144 to seat the ball 144 against the valve seat 188. In the energized state, the blow-off rod 156 moves the ball 144 off the valve seat 188 and against the valve seat 140 of the valve member 134. It should be appreciated that the valve seat insert 186 is used to resolve any potential seat leakage during pump run-on.

Referring to FIG. 3, yet another embodiment 222, according to the present invention, of the valve assembly 22 is shown. Like parts of the valve assembly 22 have like reference numerals increased by two hundred (200). The valve assembly 222 improves blow off performance and evac-and-fill. The valve assembly 222 includes the bore 228 having a first portion 228a extending at an angle downwardly to the opening 226 of the housing 224 adjacent the valve seat 232. The bore 228 also has a second portion 228b extending at an angle upwardly to the opening 226 adjacent the valve seat 240 of the valve member 234. The valve member 234 has the stem 236 extending axially a shorter length. The valve assembly 222 includes a separation member 292 disposed in the opening 226 between the ball 244 and the valve member 234. The separation member 292 is generally annular and has a generally triangular cross-section. The separation member 292 has a valve seat 294 at one end to seat against the ball 244 and a ball 296 at the end opposite the valve seat 294. The separation member 292 has a shoulder 297. The spring 242 is disposed about the stem 236 and has one end contacting the shoulder 238 and the other end contacting the shoulder 297 to urge the separation member 292 against the ball 244.

In the de-energized state of FIG. 3, the spring 242 contacts the separation member 292 to seat the ball 244 against the valve seat 232. In the energized state, the blow-off rod 256 moves the ball 244 off the valve seat 232 and against the valve seat 294 of the separation member 292. The separation member 292 is moved by the ball 244 to seat the ball 296 of the separation member 292 against the valve seat 240 of the valve member 234. It should be appreciated that the separation member 292 provides separation of valve seats and inclusion of a tortuous path for evac and fill. It should also be appreciated that the separation member 292 reduces blow-off leakage due to small ball and small seat match-up.

Referring to FIG. 4, still another embodiment 322, according to the present invention, of the valve assembly 22 is shown. Like parts of the valve assembly 22 have like reference numerals increased by three hundred (300). The valve assembly 322 incorporates the valve seat insert 386 and the separation member 392. The operation of the valve assembly 322 is similar to the valve assembly 222 except that the ball 344 is seated against the valve seat 388 of the valve seat insert 386.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

We claim:

1. A two-position, three-way solenoid valve comprising:
a valve assembly having an axial opening and including a valve member fixed in said axial opening having a first valve seat and a second valve seat disposed in said axial opening;
said valve assembly including a ball disposed in said axial opening and moveable between said first valve seat and said second valve seat;
an electromagnetic coil assembly engaging said valve assembly to move said ball between said first valve seat and said second valve seat to open and close a fluid path through said valve assembly to provide directional flow control; and
a blow-off assembly disposed in the axial opening and including a blow-off rod, a case extending axially from said rod and having an aperture in one end, a second ball moveably disposed in the case, and a first spring forcing the second ball toward the aperture.

2. A two-position, three-way solenoid-actuated valve as set forth in claim 1 wherein said blow-off rod includes a generally cylindrical rod portion extending axially of a diameter less that a remainder of said blow-off rod and having a dimple being formed on an end of said rod portion.

3. A two-position, three-way solenoid-actuated valve as set forth in claim 1 wherein said valve assembly includes a housing having said axial opening and forming said second valve seat in said axial opening.

4. A two-position, three-way solenoid-actuated valve as set forth in claim 1 including a valve seat insert disposed in said axial opening and having said second valve seat.

5. A two-position, three-way solenoid-actuated valve as set forth in claim 4 wherein said valve seat insert has an aperture extending axially therethrough.

6. A two-position, three-way solenoid-actuated valve as set forth in claim 1 wherein said valve member has a stem extending axially and having a diameter less than a diameter of a remainder of said valve member and said first valve seat being formed at one end of said stem.

7. A two-position, three-way solenoid-actuated valve as set forth in claim 6 wherein said valve member has a passageway extending axially therethrough.

8. A two-position, three-way solenoid-actuated valve as set forth in claim 1 wherein said valve assembly includes an armature assembly disposed and moveable within said electromagnetic coil assembly in response to either one of energization and de-energization of said electromagnetic coil assembly to cooperate with said blow-off assembly.

9. A two-position, three-way solenoid-actuated valve as set forth in claim 8 wherein said armature assembly includes an armature having a passageway extending axially therethrough and a rod disposed in said passageway and fixed to said armature and extending axially to engage said blow-off assembly.

10. A two-position, three-way solenoid-actuated valve as set forth in claim 1 including a housing assembly extending axially and having said axial opening.

11. A two-position, three-way solenoid-actuated valve as set forth in claim 10 wherein said housing assembly includes a housing extending axially and having said axial opening and said valve member disposed in said axial opening and fixed to said housing.

12. A two-position, three-way solenoid-actuated valve as set forth in claim 11 wherein said housing assembly includes a spring disposed between said valve member and forcing said ball against said second valve seat.

13. A two-position, three-way solenoid-actuated valve as set forth in claim 1 including a separation member disposed and moveable in said axial opening between said ball and said first valve seat.

14. A two-position, three-way solenoid-actuated valve as set forth in claim 13 wherein said separation member has a third valve seat to engage said ball.

15. A two-position, three-way solenoid-actuated valve as set forth in claim 14 wherein said separation member includes a second ball to engage said third valve seat.

16. A two-position, three-way solenoid-actuated valve as set forth in claim 15 including a spring disposed in said axial opening and contacting said separation member to force said separation member against said ball.

17. A two-position, three-way solenoid-actuated valve comprising:

a valve assembly having an axial opening;

said valve assembly including a housing assembly extending axially having said axial opening and a valve member disposed and fixed within said axial opening and having a first valve seat;

said housing assembly including means forming a second valve seat within said axial opening;

said housing assembly including a ball disposed in said axial opening between said first valve seat and said second valve seat;

said valve assembly including a blow-off valve assembly disposed and moveable in said axial opening to move said ball between said first valve seat and said second valve seat, said blow-off valve assembly including a blow-off rod, a case extending axially from said rod and having an aperture in one end, a second ball moveably disposed in the case, and a first spring forcing the second ball toward the aperture;

said valve assembly including an armature assembly cooperating with said blow-off assembly; and an electromagnetic coil assembly engaging said valve assembly and moving said armature assembly in response to energization.

18. A two-position, three-way solenoid-actuated valve as set forth in claim 17 wherein said means comprises a housing forming said second valve seat in said axial opening.

19. A two-position, three-way solenoid-actuated valve as set forth in claim 17 wherein said means comprises a valve seat insert disposed in said axial opening and forming said second valve seat.

20. A two-position, three-way solenoid-actuated valve as set forth in claim 17 including a separation member disposed in said axial opening between said first valve seat and said ball.

21. A two-position, three-way solenoid-actuated valve as set forth in claim 20 wherein said separation member has a third valve seat to engage said ball.

22. A two-position, three-way solenoid-actuated valve as set forth in claim 20 wherein said separation member includes a second ball to engage said third valve seat.

23. A two-position, three-way solenoid-actuated valve as set forth in claim 22 including a spring disposed in said axial opening to force said separation member against said ball.

* * * * *